United States Patent [19]
Holmes, Jr.

[11] 3,750,492
[45] Aug. 7, 1973

[54] ENERGY ABSORBING SHIFT LEVER

[75] Inventor: Horace D. Holmes, Jr., Clawson, Mich.

[73] Assignee: Horace D. Holmes, Sr., Ypsilanti, Mich.

[22] Filed: Sept. 20, 1971

[21] Appl. No.: 181,723

[52] U.S. Cl. ............................ 74/523, 74/473 SW
[51] Int. Cl. .................................................. G05g 1/04
[58] Field of Search .............. 74/523, 543, 473 R; 188/1 C

[56] References Cited
UNITED STATES PATENTS 3,680,405  8/1972  Naumann et al. .................. 74/543 X
3,561,281  2/1971  Wilfert ............................... 74/523 X Primary Examiner—Milton Kaufman
Assistant Examiner—Frank H. McKenzie, Jr.
Attorney—Harness, Dickey & Pierce

[57] ABSTRACT

A shift lever adapted for mounting on the steering column or the like of an automotive vehicle and including a first end portion designed to be operatively connected to the steering column and a second end portion projecting or protruding outwardly from the column and having energy absorbing means thereon for absorbing at least a portion of the impact energy or force of a person or other object moving into engagement therewith during a vehicular collision or the like.

13 Claims, 6 Drawing Figures

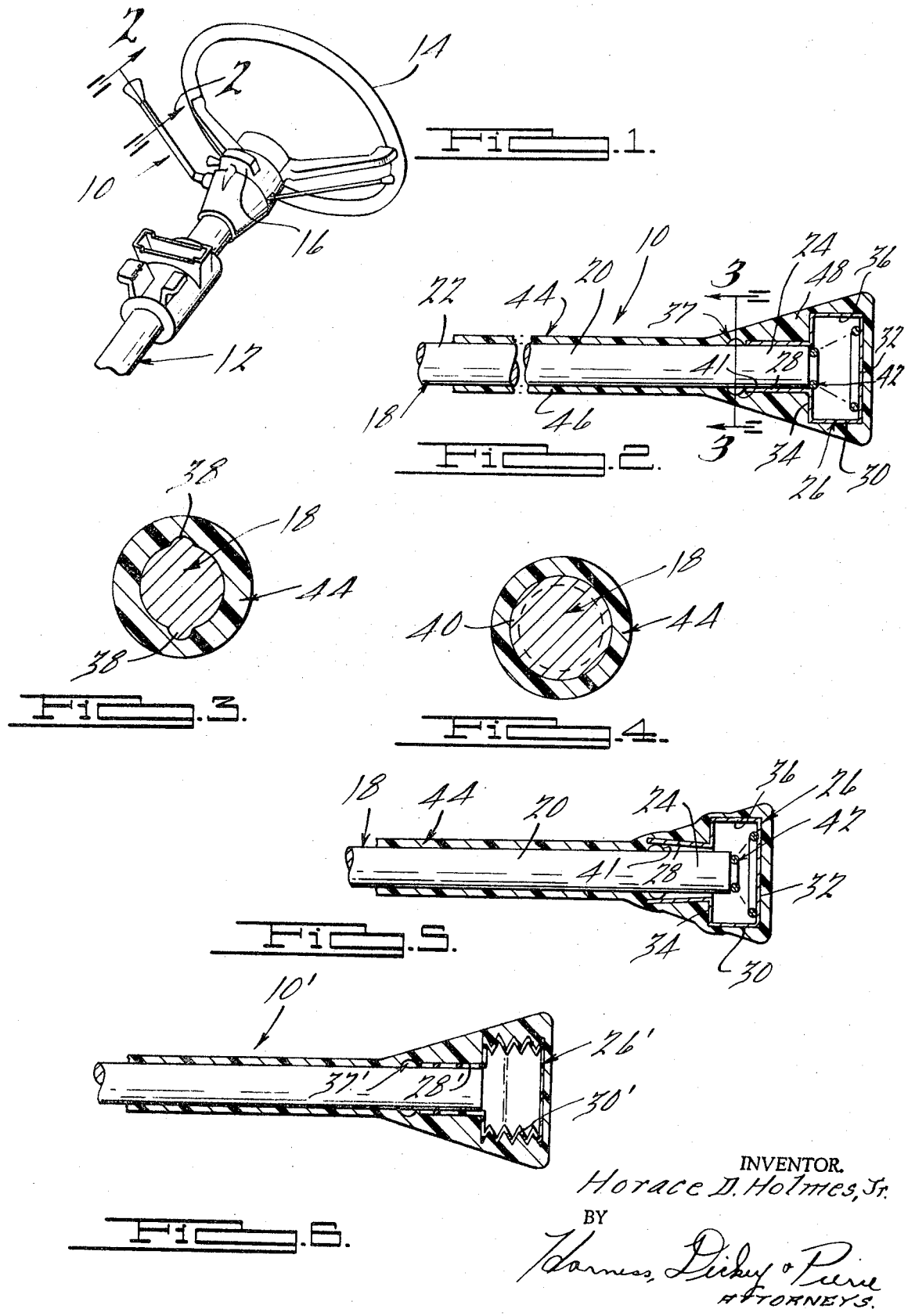

ENERGY ABSORBING SHIFT LEVER

SUMMARY OF THE INVENTION

This invention relates generally to energy or shock absorbing means for minimizing bodily or other injury during a vehicular collision, accident or similar occurrence and, more particularly, to a new and improved shift lever for automotive vehicles and the like having energy absorbing means on the outwardly projecting end thereof for absorbing or otherwise dissipating the energy or force of an object, such as the vehicle driver or passenger, being forcefully moved into engagement therewith.

It is accordingly a general object of the present invention to provide a new and improved shift lever for automotive vehicles and the like.

It is a more particular object of the present invention to provide a new and improved vehicular shift lever of the above character that includes energy absorbing means on the outwardly projecting or cantilevered end thereof.

It is still a more particular object of the present invention to provide a new and improved energy absorbing shift lever which includes means on the outwardly projecting end thereof adapted to move longitudinally or axially of the lever to absorb or dissipate impact energy.

It is still another object of the present invention to provide a new and improved energy absorbing shift lever, as above described, which utilizes a resilient deformable means as an energy or shock absorbing medium.

It is yet another object of the present invention to provide a new and improved energy absorbing shift lever that is pleasant in appearance.

It is a further object of the present invention to provide an energy absorbing shift lever that is of a simple design, is economical to commercially manufacture, and which will have a long and effective operational life.

Other objects and advantages of the present invention will become apparent from the following detailed description taken in conjunction with the accompanying drawing.

BRIEF DESCRIPTION OF THE DRAWING

FIG. 1 is an elevated perspective view of a typical vehicle steering column having the energy absorbing shift lever of the present invention operatively associated therewith;

FIG. 2 is an enlarged longitudinal cross-sectional view of the shift lever of the present invention, as taken substantially along the line 2—2 of FIG. 1;

FIG. 3 is a transverse cross-sectional view taken substantially along the line 3—3 of FIG. 2;

FIG. 4 is a view similar to FIG. 3 and illustrates a slightly modified embodiment of the present invention;

FIG. 5 is a longitudinal cross-sectional view similar to FIG. 2 and illustrates the energy absorbing shift lever of the present invention in a collapsed configuration, and FIG. 6 is a longitudinal cross-sectional view of still another embodiment of the present invention.

DETAILED DESCRIPTION OF THE PREFERRED EMBODIMENTS

Referring now in detail to the drawing and in particular to FIG. 1 thereof, an energy absorbing shift lever 10, in accordance with one preferred embodiment of the present invention, is shown in operative association with a vehicle steering column 12 that is provided with a conventional manually engageable steering wheel 14. As is the practice in the art, the shift lever 10 is cantilever supported upon the column 12, with one end thereof projecting outwardly from the column 12 and adapted to be manipulated by the vehicle operator to effect a changing of the associated vehicle transmission gears, the particular gear "setting" being determined by a preselected orientation or positioning of the lever 10, and/or a conventional indicating mechanism or the like 16 mounted upon the column 12 or other visible location within the vehicle.

As best illustrated in FIG. 2, the shift lever 10 of the present invention comprises an elongated, generally cylindrically shaped shift member 18 having a central or intermediate section 20 which may be of any suitable curved or angular configuration, depending upon the style and location of the steering column 12 within the associated vehicle. One end of the member is formed with an integral mounting section 22 that is adapted to be operatively secured to the appropriate shift mechanism (not shown) within or upon the column 12, in a manner well known in the art. The opposite end of the member 18 is formed with an integral, generally cylindrically shaped energy absorbing section 24 which is adapted to function in a manner hereinafter to be described in absorbing impact energy of a person or other object moving into engagement with the shift lever 10 during a vehicle collision, or the like.

Operatively mounted upon the section 24 of the member 18 is an energy absorbing element, generally designated by the numeral 26, which comprises a tubular or sleeve-shaped first section 28 that is slightly larger in diameter than the section 24 and is adapted to be telescopically received thereon, as best seen in FIG. 2. The section 28 is operatively connected to a second, generally cylindrically shaped section of the element 26, herein identified by the numeral 30, and comprising a pair of axially spaced radially extending end portions 32 and 34 and a generally cylindrical side wall portion 36, the portions 32, 34 and 36 providing a relatively enclosed area. It will be noted that the portions 32–36 may be completely enclosed or may provide a relatively perforated or open caged enclosure, for purposes later to be described.

As illustrated in FIG. 2, the section 24 of the shift member 18 is formed with projection means in the form of an integral radially outwardly extending portion 37 that is located directly adjacent the inner end of the first section 28 of the element 26. The portion 37 may be provided by one or more radially outwardly extending, circumferentially spaced ears or embossments, as illustrated in FIG. 3 and generally designated by the numeral 38. Alternatively, the portion 37 may comprise a continuous annular ridge or embossment 40 extending circumferentially around the section 28 of the member 18, as illustrated in FIG. 4. It will be appreciated, of course, that the portion 37 may be of various alternate shapes and configurations without departing from the scope of the present invention, provided, however, that whatever shape or configuration that the portion 37 assumes, some means, such as a radially outwardly and axially inclined or tapered camming face or surface 41, is provided on the side thereof which confronts adjacent or inner end of the element 26, the purpose of which surface 41 will be described in connection with the overall operation of the present invention.

In accordance with the present invention, a resilient compressible spring means is provided within the enclosed area defined by the portions 32–36 of the element 26, which spring means is preferably, although not necessarily, in the form of a helical coil spring 42 having one end thereof abutting against the inner side of the end portion 32 of the section 30, while the opposite end of the spring 42 bears against axially outer end of the shift member 18.

The spring 42 is adapted to function in an energy absorbing capacity upon impact of a person or other object with the shift lever 10 of the present invention, as will hereinafter be described.

Further in accordance with the present invention, the entire outer periphery of the shift lever 10, or at least that portion of the lever 10 that projects outwardly from the steering column 12, is adapted to be covered or surrounded with a layer or covering of a resilient elastomeric material, which may, for example, consist of a layer of molded natural or synthetic rubber or a molded urethane polymer, such as polyurethane, that may have a separate or integral exterior protective skin, as is well known in the art. The layer of resilient material is identified by the numeral 44 in the drawing and preferably comprises a generally cylindrical portion 46 that covers the intermediate section 20 of the shift member 18, and a generally frusto-conical portion 48 that covers and entirely encloses the energy absorbing element 26 and section 24 of the member 18. The layer 44 may be applied by any one of a number of well known molding or other techniques and in a manner such that the portions 42 and 44 smoothly blend into each other so as to be aesthetically pleasing in appeaance.

Referring now to the overall operation of the energy absorbing shift lever 10 of the present invention, it will be appreciated that the lever 10 is normally in the condition illustrated in FIG. 2; however, at such time as the associated vehicle is involved in an accident or collision or for some other reason an object or person is moved into engagement with the axially outer end of the lever 10 with the requisite force, preferably in the order of approximately 2,500 to 3,000 pounds, the energy absorbing element 26 will be forced axially inwardly from the position shown in FIG. 2 to the position appearance. shown in FIG. 5. When this occurs, the camming surface 41 will cause the section 28 of the element 26 to be forced radially outwardly over the outer periphery of the portion 37. Thus, the sleeve section 28 of the element 26 will be deformed radially outwardly to the configuration shown in FIG. 5 and thereby absorb or dissipate a certain amount of the impact energy of the object engaging the lever 10. Simultaneously, the coil spring 42 will be compressed upon axial inward movement of the element 26 and concomitantly, the elastomeric layer 44 will be deformed from the condition shown in FIG. 2 to that shown in FIG. 5, with the result that the impact energy is not only dissipated by the element 26, but also by the spring 42 and layer 44 so as to minimize injury to the object or person. It will be noted that the energy absorbing element is preferably, although not necessarily, fabricated of a suitable gage metal whereby to accommodate for the deformable action of the sleeve section 28 thereof; however, the present invention is in no way intended to be limited to this specific material, since various alternate materials, such as certain deformable plastics and the like, could be used without departing from the scope of the present invention.

FIG. 6 illustrates a slightly modified embodiment of the present invention wherein a shift lever 10' is shown provided with an energy absorbing element 26' having a second section 30' (analogous to the section 30 of the element 26 hereinabove described) fabricated of expanded metal, herein designated by the numeral 50. As is known in the art, such expanded metal, when subjected to a compressive force, is adapted to deform and thereby function in an energy absorbing capacity. It will be noted that in this alternate embodiment of the present invention, it is not necessary that the associated sleeve section 28' be axially movable over the projection means 37' on the shift member 18', since the energy dissipation will be accomplished by deformation of the expanded metal section 50, although for certain applications, deformation of the section 28' may be found advantageous, in which case energy absorbtion may be achieved by both deformation of the expanded metal section 50' and deformation of the sleeve section 28', as above described.

It will be seen from the foregoing that the present invention provides a novel shift lever for automotive and similar type vehicles which is adapted to be highly effective in absorbing of dissipating impact energy from a person or other object being moved into engagement therewith. The shift lever of the present invention will be seen to be of a relatively simple design so that it will be extremely economical to commercially manufacture. Toward this end, it will be noted that the shift lever design disclosed herein eliminates certain costly and time consuming manufacturing steps required on presently manufactured shift levers, and thus the present invention provides a shift lever which is not only more economical to manufacture than previous type levers, but also one that is far less likely to cause serious injury upon impact or engagement therewith.

While it will be apparent that the preferred embodiment illustrated herein is well calculated to fulfill the objects above stated, it will be appreciated that the present invention is susceptible to modification, variation and change without departing from the scope of the invention.

What is claimed is:

1. An energy absorbing shift lever comprising,
    an elongated shift member,
    means for operatively mounting said member whereby one end portion thereof projects outwardly from an associated support, and
    energy absorbing means on said one end portion of said member of absorbing impact energy of an object moving into engagement therewith,
    said energy absorbing means including a mounting portion in telescopic engagement with said end portion of said member for at least partially securing said means thereon.

2. The invention as set forth in claim 1 wherein said energy absorbing means further includes a deformable element mounted on said one end portion of said member.

3. The invention as set forth in claim 1 wherein said energy absorbing means includes a resilient spring means mounted on said one end portion of said member.

4. The invention as set forth in claim 1 which includes second energy absorbing means, and wherein one of said energy absorbing means comprises a resilient elastomeric material at least partially covering said one end portion of said member.

5. The invention as set forth in claim 1 wherein said energy absorbing means includes an energy absorbing element on said one end portion of said member, and means for causing a portion of said element to become deformed upon impact of the object with said shift lever.

6. The invention as set forth in claim 5 wherein at least a portion of said element is fabricated of expanded metal.

7. The invention as set forth in claim 5 wherein said element comprises first and second portions, and wherein one of said portions comprises said mounting portion, and wherein one of said portions is adapted to deform upon engagement of an object with the shift lever.

8. The invention as set forth in claim 7 wherein said first portion comprises said mounting portion and said second portion is adapted to deform.

9. The invention as set forth in claim 7 wherein said mounting portion secures secure said element on said member and is also deformable to absorb impact energy.

10. The invention as set forth in claim 7 wherein said mounting portion of said element is of a generally sleeve shaped configuration telescopically engaged with said one end portion, wherein said second portion of said element comprises enclosure means, and which includes spring means within said enclosure means cooperable with said one section for absorbing impact energy.

11. The invention as set forth in claim 10 which includes a resilient elastomeric material at least partially covering said element and adapted to cooperate therewith in an energy absorbing capacity.

12. The invention as set forth in claim 10 which includes means for deforming said sleeve shaped first portion of said element upon engagement of an object with the shift lever.

13. The invention as set forth in claim 12 wherein said deforming means comprises means projecting outwardly from said end portion of said lever and adapted to deform said first portion of said element upon relative axial movement therebetween.

* * * * *